United States Patent
Maoz et al.

(10) Patent No.: US 10,015,541 B2
(45) Date of Patent: Jul. 3, 2018

(54) STORING AND RETRIEVAL HEURISTICS

(71) Applicant: Cisco Technology, Inc., San Jose, CA (US)

(72) Inventors: Tal Maoz, Jerusalem (IL); Gal Moshitch, Jerusalem (IL); Aliza Itzkowitz, Jerusalem (IL); Zeev Geyzel, Tekoa (IL); Reuven Wachtfogel, Elazar (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 505 days.

(21) Appl. No.: 14/667,839

(22) Filed: Mar. 25, 2015

(65) Prior Publication Data

US 2016/0283477 A1 Sep. 29, 2016

(51) Int. Cl.
*H04H 60/32* (2008.01)
*H04N 21/434* (2011.01)
(Continued)

(52) U.S. Cl.
CPC ... *H04N 21/4345* (2013.01); *G06F 17/30802* (2013.01); *G06F 17/30817* (2013.01);
(Continued)

(58) Field of Classification Search
CPC ......... G06F 17/30781; G06F 17/30784; G06F 17/30799; G06F 17/30802;
(Continued)

(56) References Cited

U.S. PATENT DOCUMENTS 6,466,670 B1 10/2002 Tsuria et al.
6,469,749 B1 10/2002 Dimitrova et al.
(Continued)

FOREIGN PATENT DOCUMENTS

CN 103929644 7/2014
WO 2010/049755 5/2010
(Continued)

OTHER PUBLICATIONS

Hsu, Chiou-Tin et al; "Content-Based Image Retrieval by Interest Points Matching and Geometric Hashing"; in Proc. SPIE 4925, Electronic Imaging and Multimedia Technology III, 80 (Sep. 4, 2002).
(Continued)

*Primary Examiner* — James R Sheleheda
(74) *Attorney, Agent, or Firm* — Merchant & Gould P.C.

(57) ABSTRACT

In one embodiment, a system comprises a processor to retrieve a first data element including a value $X_0$ and $Y_0$, provide a hash function for use with a hash table having buckets, the hash function having a first and second input that in combination map to one of the buckets wherein the first input is in a range of X-values having X-value sub-ranges, the second input is in a range of Y-values having Y-value sub-ranges, different combinations of the X-value sub-ranges and the Y-value sub-ranges map using the hash function to different buckets, and input the value $X_0$ and $Y_0$ into the hash function yielding an output which is indicative of a first bucket of the hash-table. Related apparatus and methods are also described.

16 Claims, 10 Drawing Sheets

(51) Int. Cl.
  G06K 9/00 (2006.01)
  H04N 21/234 (2011.01)
  H04N 21/84 (2011.01)
  G06F 17/30 (2006.01)
(52) U.S. Cl.
  CPC ... *G06F 17/30949* (2013.01); *G06K 9/00744* (2013.01); *G06K 9/00758* (2013.01); *H04N 21/23418* (2013.01); *H04N 21/84* (2013.01)
(58) Field of Classification Search
  CPC .......... G06F 17/30949; G06K 9/00744; G06K 9/00758; H04N 21/84; H04N 21/23418
  See application file for complete search history.

(56) References Cited

U.S. PATENT DOCUMENTS

| | | | |
|---|---|---|---|
| 6,675,174 B1* | 1/2004 | Bolle | G06F 17/30802 |
| 7,168,083 B2 | 1/2007 | Kalker et al. | |
| 8,181,196 B2 | 5/2012 | Falcon | |
| 8,224,157 B2 | 7/2012 | Nam et al. | |
| 8,230,343 B2 | 7/2012 | Logan et al. | |
| 8,572,669 B2 | 10/2013 | Smith et al. | |
| 8,686,731 B2 | 4/2014 | Ramanathan et al. | |
| 8,700,641 B2 | 4/2014 | Covell et al. | |
| 8,786,785 B2* | 7/2014 | Hendrickson | H04N 21/8352 348/700 |
| 8,838,609 B1 | 9/2014 | Sharifi et al. | |
| 8,863,165 B2 | 10/2014 | Gordon | |
| 9,578,394 B2* | 2/2017 | Geyzel | H04N 21/835 |
| 2007/0016918 A1 | 1/2007 | Alcorn et al. | |
| 2009/0083781 A1 | 3/2009 | Yang et al. | |
| 2010/0279622 A1* | 11/2010 | Shuman | H04W 24/08 455/67.11 |
| 2011/0311095 A1 | 12/2011 | Archer | |
| 2012/0008821 A1 | 1/2012 | Sharon et al. | |
| 2012/0257116 A1* | 10/2012 | Hendrickson | H04N 21/8352 348/700 |
| 2012/0321271 A1 | 12/2012 | Baldwin et al. | |
| 2013/0039584 A1* | 2/2013 | Harmanci | G06K 9/38 382/197 |
| 2014/0013352 A1 | 1/2014 | Shavit et al. | |
| 2014/0196070 A1 | 7/2014 | Moskowitz et al. | |
| 2014/0201787 A1 | 7/2014 | Neumeier et al. | |
| 2014/0254934 A1 | 9/2014 | Laxminarayana Bhat et al. | |
| 2014/0325555 A1 | 10/2014 | Khader et al. | |
| 2014/0358882 A1 | 12/2014 | Diab | |
| 2015/0227557 A1* | 8/2015 | Holzschneider | G06F 17/30256 382/218 |
| 2015/0227796 A1* | 8/2015 | Holzschneider | G06F 17/30256 382/103 |
| 2016/0110605 A1* | 4/2016 | Holzschneider | G06F 17/30256 382/103 |
| 2016/0283477 A1* | 9/2016 | Maoz | G06K 9/00744 |
| 2016/0286266 A1* | 9/2016 | Moshitch | H04N 21/23418 |
| 2016/0286285 A1* | 9/2016 | Geyzel | H04N 21/835 |
| 2016/0360433 A1* | 12/2016 | Vaderna | H04W 24/08 |

FOREIGN PATENT DOCUMENTS

| | | |
|---|---|---|
| WO | 2010/064263 | 6/2010 |
| WO | 2014/160894 | 10/2014 |

OTHER PUBLICATIONS

Oostveen, Job et al: "Feature Extraction and a Database Strategy for Video Fingerprinting" in Proceedings of the 5th International Conference on Recent Advances in Visual Information Systems (VISUAL '02), pp. 117-128.

Wolfson, Haim J. et al; "Geometric Hashing: An Overview": in IEEE Computational Science & Engineering, IEEE Computer Society, Usm vol. 4 No. 4. Oct. 1, 1991, pp. 10-21.

Wikipedia; "Hash Table"; available at: https://web.archive.org/web/20120620103940/https://en.wikipedia.org/wiki/Hash_table; Jun. 20, 2012.

International Search Report dated May 20, 2016 in connection with PCT/IB2016/050872.

Schneider, Marc. "A Robust Content Based Digital Signature for Image Authentication", pp. 227-230, Sep. 16, 1996.

Shen, Heng Tao et al, "Effective and Efficient Query Processing for Video Subsequence Identification", in Knowledge and Data Engineering, IEEE Transactions on, vol. 21, No. 3, pp. 321,334, Aug. 6, 2008.

Wikipedia "Locality Sensitive Hashing", Jan. 11, 2015.

Zhou, Xiangmin et al, "Adaptive Subspace Symbolization for Content-Based Video Detection", in Knowledge and Data Engineering, IEEE Transactions, vol. 22, No. 10, pp. 1372,1387, Jul. 17, 2009.

Simand, Isabelle et al, "Spatio-Temporal Signatures for Video Copy Detection" in International conference on Advanced Concepts for Intelligent Vision Systems (ACVIS'2004), Brussels, Belgium, Sep. 2004.

Cheung, Sen Ching S, et al: "Fast Similarity Search and Clustering of Video Sequences on the World-Wide-Web", in Multimedia, IEEE Transactions on, vol. 7, No. 3, pp. 524,537, 2005

"NEC Releases Video Identification Software That Rapidly Locates Clips Within Vast Video Collections", Apr. 10, 2012.

Android and Me—Videosurf is Like Shazam, but for Video; Jan. 1, 2011.

Bayram, Sevinc et al, "Video Copy Detection based bn Source Device Characteristics: A Complementary Approach to Content-Based Methods", in Proceedings of the 1st ACM international conference on Multimedia information retrieval (MIR '08).

Cheung Sen-ching S. et al, "Efficient Video Similarity Measurement and Search", Jan. 31, 2003.

Hirzallah, Nael, "A Novel Method to Search for Similar Video Clips within a TV Broadcast", IJIMT International Journal of Innovation, Management and Technology vol. 3, No. 5, pp. 540-543, 2012.

Hirzallah, Nael, "A Fast Method to Spot a Video Sequence within a Live Stream", Journal of Multimedia, vol. 6, No. 2, Apr. 2011, p. 181.

Hoad, T.C. and Zobel, J. "Detection of Video Sequences using Compact Signatures", in ACM Transactions on Information Systems, vol. 24, No. 1 pp. 1-50, Jan. 1, 2006.

Kaneko, Hiroshi et al, "Video Identification Solution Using a "Video Signature"" NEC Technical Journal, vol. 6, No. 3 Oct. 2011, p. 24.

Lee, Seungjae et al; "Video Fingerprinting Based on Orientation of Luminance Centroid", in Multimedia and Expo, 2009, ICME 2009, IEEE International Conference on, vol., No., pp. 1385, 1389

Lee, Sunil et al, "Robust Video Fingerprinting for Content-Based Video Identification", in Circuits and Systems for Video Technology, IEEE Transactions on, vol. 18, No. 7, pp. 983,986, Aug. 27, 2007.

Lejsek, Herwig et al, "NV-Tree: Nearest Neighbors at the Billion Scale", Apr. 17, 2011.

Li, Zhu et al, "Locally Embedded Linear Subspaces for Efficient Video Indexing and Retrieval", in Proceedings IEEE International Conference on Multimedia and Expo, pp. 1765-1768, Jul. 9, 2006.

Oostveen, Job et al. "Feature Extraction and a Database Strategy for Video Fingerprinting"in Proceedings of the 5th International Conference on Recent Advances in Visual Information Systems (VISUAL '02), pp. 117-128, Apr. 23, 2002.

San Pedro, Jose et al, "Content Redundancy in Youtube and its Application to Video Tagging", in ACM Trans. Inf. Syst. 29, 3, Article 13 (Jul. 2011), 31 pages.

\* cited by examiner

STORING AND RETRIEVAL HEURISTICS

TECHNICAL FIELD

The present disclosure generally relates to storing and retrieval of information.

BACKGROUND

Video sequences may be identified for many reasons, including recognizing a TV show rerun in order to associate existing metadata with the show, recognizing when certain adverts or content items are being broadcast, identifying pirated content and other data analysis tasks. Video signatures may be used to identify video sequences.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention a system including a processor, and a memory to store data used by the processor, wherein the processor is operative to retrieve a first data element from the memory, the first data element including a value $X_0$ and a value $Y_0$, provide a hash function for use with a hash table having a plurality of buckets, the hash function having a plurality of inputs including a first input and a second input that in combination map to one of the buckets wherein (a) the first input is in a range of X-values having a plurality of non-overlapping X-value sub-ranges, (b) the second input is in a range of Y-values having a plurality of non-overlapping Y-value sub-ranges, (c) when the first input is any value in one of the X-value sub-ranges and the second input is any value in one of the Y-value sub-ranges the hash function maps to a same one of the buckets, and (d) different combinations of the X-value sub-ranges and the Y-value sub-ranges map using the hash function to different ones of the buckets, and input the value $X_0$ and the value $Y_0$ into the hash function yielding an output which is indicative of a first bucket of the buckets of the hash-table.

There is also provided in accordance with still another embodiment of the present invention a system including a processor, and a memory to store data used by the processor, wherein the processor is operative to retrieve a first video signature from the memory, the video signature being a video signature of a content item currently being broadcast, determine that the first video signature corresponds to a beginning of the content item currently being broadcast, the beginning being within the first five minutes of the start of the content item, and issue a command to compare the first video signature to a database of video signatures starting the comparison from the video signatures corresponding to the beginning of content items before searching other ones of the video signatures.

Description Continued

Figure 1:
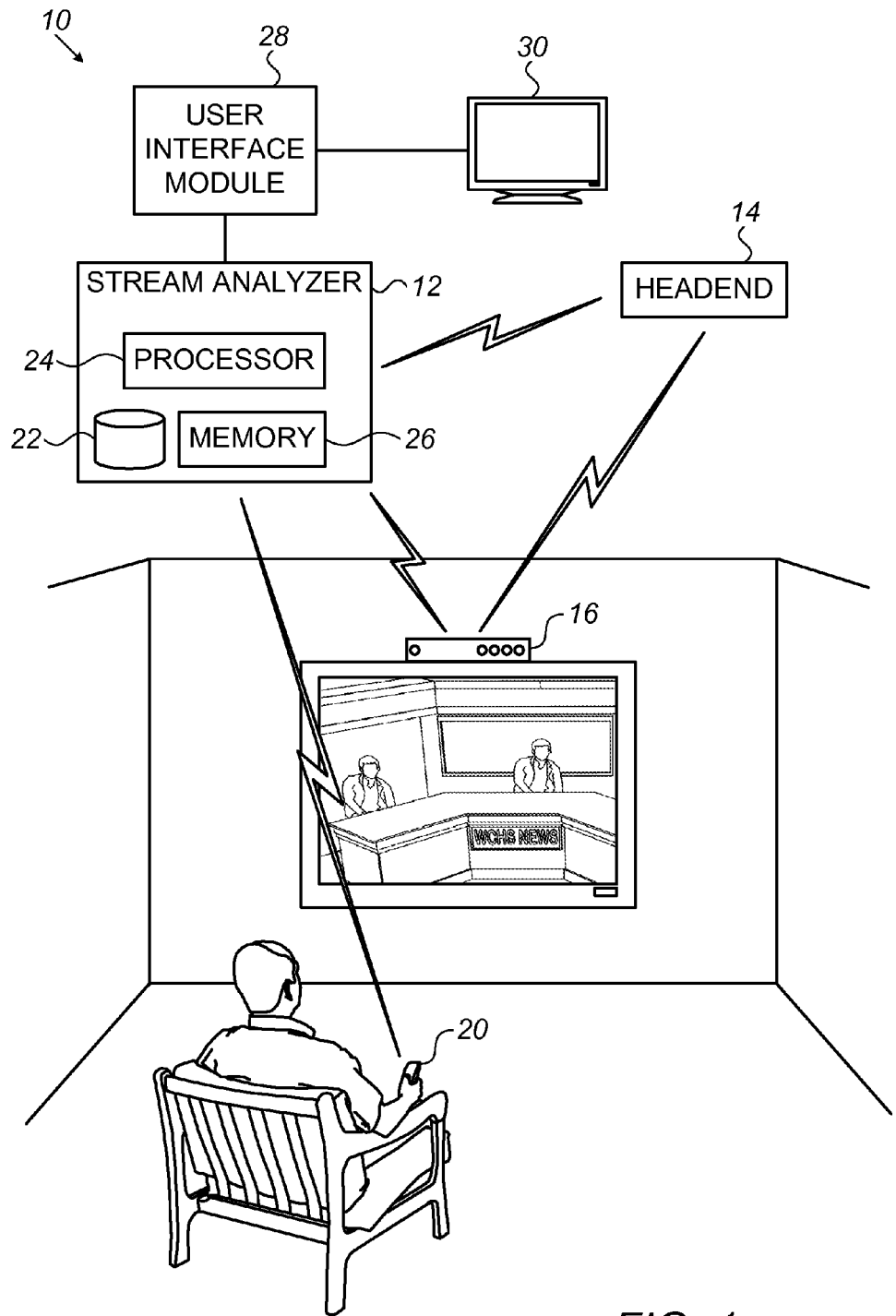
FIG. 1 is a partly pictorial, partly block diagram view of a broadcast system including a stream analyzer constructed and operative in accordance with an embodiment of the present invention.

Reference is now made to FIG. 1, which is a partly pictorial, partly block diagram view of a broadcast system 10 with a stream analyzer 12 constructed and operative in accordance with an embodiment of the present invention.

Video sequences may be identified using video signatures, sometimes known as video fingerprints, in a number of scenarios, including checking for pirated copies of movies or in a broadcast scenario. In a broadcast scenario, identifying video sequences may be useful in associating metadata with currently broadcast content.

Although the video signature creation and matching methods described herein are described with reference to the broadcast system 10, it will be appreciated that the creation and matching methods may be applied in any suitable scenario, for example, but not limited to, looking for pirated copies of movies.

The broadcast system 10 typically includes a Headend 14, a plurality of end-user receiver devices 16 (only one shown for the sake of simplicity) and the stream analyzer 12.

Content is typically supplied (broadcast or multicast) by the Headend 14 to the end-user receiver devices 16 or to any other suitable receiving device for example, but not limited to, a mobile device 20 with content receiving and playing capabilities. Alternatively or additionally, the receiving devices may retrieve/receive content from a content server delivering pay-per-view content by way of example only.

The content may be delivered by the Headend 14 using any suitable communication technology, for example, but not limited to, satellite, cable, Internet Protocol (IP), terrestrial or wireless communications.

Ideally, content items are typically transmitted/transferred from the Headend 14 with appropriate metadata about the content items. However, some content items may be associated with little or no metadata.

The stream analyzer 12 is operative to receive/retrieve the content transmitted/transferred by the Headend 14. The stream analyzer 12 attempts to identify the content by comparing video signatures of the broadcast content to a database 22 of video signatures. It will be appreciated that the stream analyzer 12 may also analyze non-broadcast content items. It should also be noted that content items may be any suitable content items, for example, but not limited to, TV programs, movies, advertisements, trailers and promotional videos. Once a content item has been identified based on an appropriate video signature match, appropriate metadata may be linked with that content item for use by other devices. The metadata for the content item may already be in the database 22 (associated with the existing video signature which matched the broadcast content item) or the metadata may be retrieved via a suitable search of an information database based on a content ID (for example, serial number or title) of the matching content.

The Headend 14 may retrieve the metadata or a link to the metadata of the broadcast content item from the stream analyzer 12 for sending to the end-user receiver devices 16. Alternatively or additionally, the end-user receiver devices 16 and/or the mobile device 20 may retrieve the metadata or a link to the metadata of the broadcast content item from the stream analyzer 12 via IP or any other suitable wired or wireless link.

The stream analyzer 12 is typically implemented on at least one server, optionally in a cloud computing environment. The stream analyzer 12 typically includes a processor 24 and a memory 26 to store data used by the processor 24.

The stream analyzer 12 may send certain video sequences to a user interface module 28 for manual metadata tagging. The user interface module 28 is also typically associated with a display device 30 for displaying the video sequences which require manual metadata tagging. The user interface module 28 may be implemented on the same processor/server as the stream analyzer 12 or on a different processor/server. The user interface module is described in more detail with reference to FIGS. 9 and 10.

An example embodiment of the stream analyzer 12 will be described in more detail with reference to FIGS. 2A to 12 below. The signature generation and matching may be performed by the same processor/server or may be performed with different processors/servers. The matching process may be distributed over many processors/servers.

It will be appreciated that in a broadcast scenario, the video signature generation and matching may need to be configured to index and detect more than 100 channels, 24 hours a day, 7 days a week and to operate in real-time.

Signature Generation

Figure 2A:
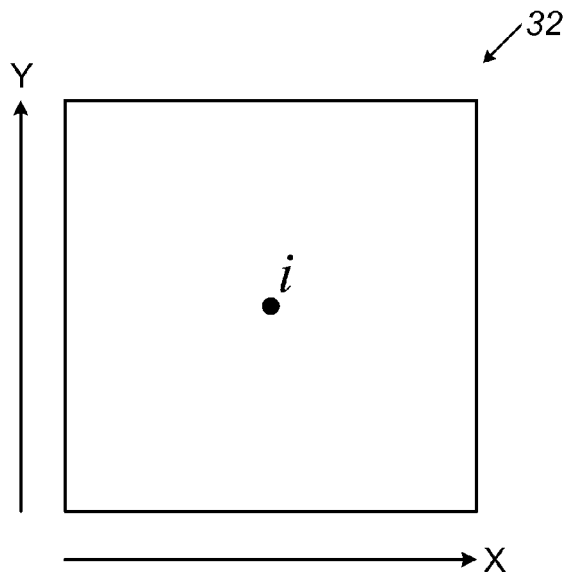
FIG. 2A is a view of a video frame being processed by the stream analyzer of FIG. 1 constructed and operative in accordance with an embodiment of the present invention.

Reference is now made to FIG. 2A, which is a view of a video frame 32 being processed by the stream analyzer 12 of FIG. 1 in accordance with an embodiment of the present invention.

Each digital signature is generated for a single video frame. The process is repeated and a video signature is generated for each frame that is sampled from a video stream. The sampling rate is a configurable parameter. The inventors have found that a sampling rate of 1 frame per second provides good results. However, it will be appreciated by one of ordinary skill in the art that the sampling rate may be greater or less than one frame per second depending on the particular application and the accuracy needed in that application. When choosing the sampling rate there is a trade off between performance and accuracy as will be described in the matching stage with reference to FIG. 4.

A process for generating a video signature for a single frame is as follows and is described with reference to the video frame 32.

First, a weighted average luminance is calculated for the frame 32 as a whole. The result is a pair of floating point numbers representing a luminance "center of mass" of the frame 32, which is computed with the following equation:

$$\bar{y} = \frac{\Sigma Li \cdot Yi}{\Sigma Li \cdot \text{Rows}}$$

$$\bar{x} = \frac{\Sigma Li \cdot Xi}{\Sigma Li \cdot \text{Columns}}$$

$$\bar{x}, \bar{y} \in [0, 1]$$

Where:
Li is the luminance value of pixel i
Xi is the column (1 based) index of pixel i and
Yi is the row (1 based) index of pixel i.

The luminance values are normalized such that 0 represents no luminance and 1 is maximum luminance.

A single "center of mass" point is not generally sufficient to characterize a single frame and therefore the frame 32 is divided into several sub-images or sub-regions and the above luminance "center of mass" calculation is determined per sub-image as will now be described below in more detail.

Figure 2B:
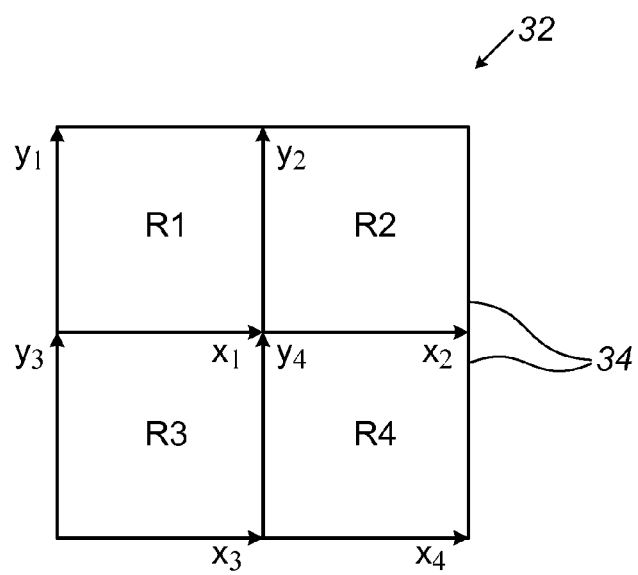
FIGS. 2B-D are views of the video frame of FIG. 2A sub-divided into smaller regions.
Figure 2C:
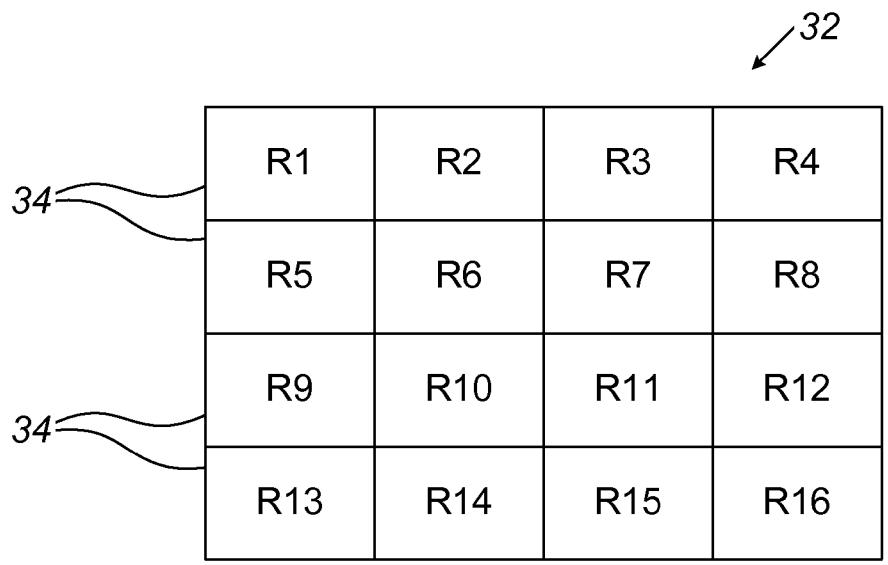
Figure 2D:
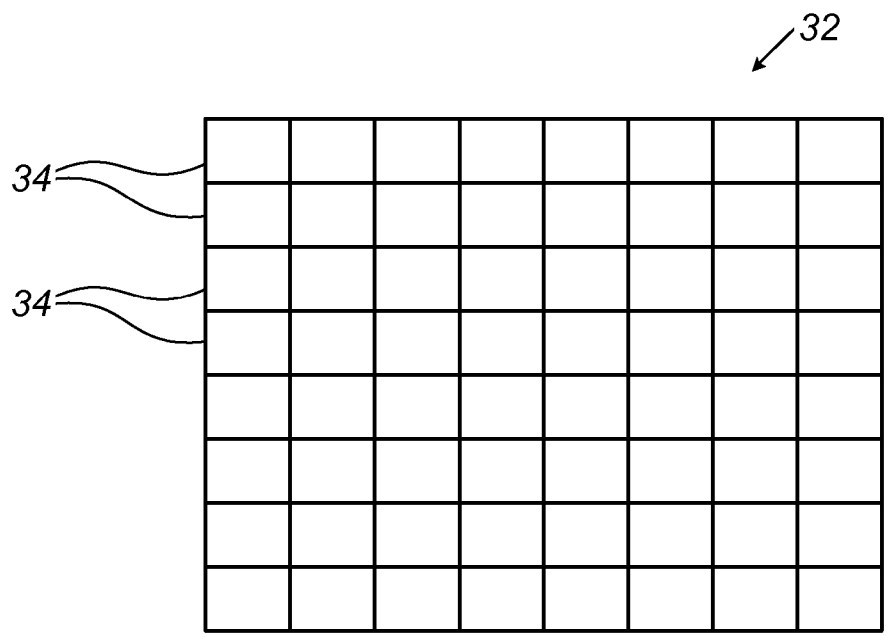

Reference is now made to FIGS. 2B-D which are views of the video frame 32 of FIG. 2A sub-divided into smaller regions 34 (only some labeled for the sake of simplicity).

The video frame 32 is sub-divided into the smaller regions 34 (for example into 2 blocks by 2 blocks, i.e.: the video frame 32 is divided into 4 sections, R1-R4 as shown in FIG. 2B) and the weighted average luminance for each sub-block (region 34) is calculated giving 4 sets of ($\bar{x},\bar{y}$) values.

The "center of mass" of each region 34 is computed in the same way that the "center of mass" is computed for the whole video frame 32 by assuming that each region 34 has its own x and y axis, shown as x1, y1 etc. in FIG. 2B.

The video frame 32 is sub-divided into smaller regions 34 (for example into 4 blocks by 4 blocks, i.e.: the video frame 32 is divided into 16 sections, R1-R16 as shown in FIG. 2C) and the weighted average luminance for each sub-block (region 34) is calculated giving 16 sets of ($\bar{x},\bar{y}$) values.

The ($\bar{x},\bar{y}$) pair is also called Lx and Ly below.

For higher accuracy which may be desirable in many cases, discussed in more detail below, the video frame 32 may be sub-divided into even smaller regions 34 (for example into 8 blocks by 8 blocks, i.e.: the video frame 32 is divided into 64 sections, as shown in FIG. 2D) and the weighted average luminance for each sub-block (region 34) is calculated giving 64 sets of ($\bar{x},\bar{y}$) values.

It should be noted that the division of the video frame 32 into the regions 34 is not fixed to the 2 by 2, 4 by 4, 8 by 8 division described above. The video frame 32 may be sub-divided into any suitable arrangement of smaller and larger regions 34. For example, the frame 32 may be divided as follows: 3 by 4, 6 by 6 and 8 by 10.

In some scenarios, a video signature at 3 different levels may be sufficient, where the 3 levels include:

Level1: The "center of mass" of the full frame 32. The result is a single $(\bar{x},\bar{y})$ point.

Level2: The "center of mass" for each sub-frame (region 34) when dividing the frame 32 into 2 by 2 blocks for a total of 4 sub-frames. The result is a list of 4 $(\bar{x},\bar{y})$ points.

Level3: The "center of mass" for each sub-frame when dividing the frame into 4*4 blocks for a total of 16 sub-frames. The result is a list of 16 $(\bar{x},\bar{y})$ points.

The final signature of the frame 32 is an aggregation of the above $(\bar{x},\bar{y})$ pairs starting with level 1, followed by level 2 and then level 3 to give 42 floating point numbers.

Below is a sample signature formatted in Java script Object Notation (JSON):

```
[
  [
    [0.5251846909523010,0.5013828277587891]
  ],
  [
    [0.2385583966970444,0.2277309149503708],
    [0.2512754797935486,0.7923355102539062],
    [0.7867733836174011,0.2629095911979675],
    [0.7763652205467224,0.7456805706024170]
  ],
  [
    [0.1315004080533981,0.1281870603561401],
    [0.1235049143433571,0.3576585948467255],
    [0.1162016987800598,0.6349514126777649],
    [0.1296168714761734,0.8754147887229919],
    [0.3652710616588593,0.1251327842473984],
    [0.3763325810432434,0.3682374954223633],
    [0.3912256956100464,0.6231636404991150],
    [0.3665043115615845,0.8841994404792786],
    [0.6589550375938416,0.1265390962362289],
    [0.6356432437896729,0.3820896744728088],
    [0.6367280483245850,0.6242906451225281],
    [0.6460356116294861,0.8808684945106506],
    [0.8794991970062256,0.1270627230405807],
    [0.8779063224792480,0.3745059669017792],
    [0.8732576966285706,0.6255287528038025],
    [0.8739495873451233,0.8761103749275208]
  ]
]
```

For many scenarios a 4th level may be added; for example, where the video frame 32 is split into 8 by 8 regions of 64 sub-frames yielding 64 additional $(\bar{x},\bar{y})$ points in the video signature giving a total of 170 floating point numbers in the video signature.

The inventors have found that a CPU system without a GPGPU (General-purpose computing on graphics processing unit) (such as a PC with the following specification: Core i7 X990 at 3.47 GHz 12M, 24 MB Triple-channel DDR3 RAM=6*4 GB at 1066 MHz, 4*500 GB 7200 RPM 3.5 HDs with MDRaid5)) may calculate the above signatures for 60 frames per second for HD content without any compiler optimizations. The calculations may be further optimized by using multi-threading and GPGPU increasing the calculation rate to hundreds of frames per second using a single GPGPU device. Assuming a sampling rate of 1 frame per second, this translates to processing hundreds of videos on a single server with a GPGPU device.

In the case of MPEG based videos such as MPEG-2/4 or H.264, the above signature generation process can be highly optimized due to the properties of the MPEG compression.

In MPEG compression, the image is divided into macroblocks, from which the luminance and chroma components are sampled. During this process, the luminance values are fully sampled, meaning no data is lost. The samples are then transformed using DCT (Discrete Cosine Transform) and quantized using a predefined quantization matrix, which is basically a weighting function for the DCT coefficients.

Although some information is lost during the quantization, the commonly used quantization matrices are such that more emphasis is given to the lower DCT frequencies while the higher frequencies are more likely to be lost. This means that when the quantization is reversed, the resulting image would potentially be slightly blurred compared to the original image. However, since the signature generated is for weighted average luminance, the effect on creating signatures and being able to identify matches is generally not impacted by the DCT transformation. The actual signatures generated may, of course, be slightly different as the numbers have changed. However, such blurring is, in effect, an averaging over the macroblock pixels and thus the overall effect for the final signature is negligible.

The video signatures can be quickly and efficiently calculated from the transformed and quantized luminance values by reconstructing the luminance macroblocks, yielding a luminance value for each pixel in the frame. In the case of simple 1 frames, the quantization and the DCT is inverted. In the case of P or B frames, or mixed I/P/B frames (as used in H.264, for example), the delta macroblocks are summed to create final macroblocks before inverting the quantization and the DCT. The calculations described above are then performed to determine the weighted average luminance for the video frame 32 and all the regions 34 of the video frame 32 at the various different levels.

It should be noted, that at no point, do the original color frames need to be reconstructed as only the luminance value, and the position, of each pixel are used in the signature calculation. Furthermore, because there is generally no need to calculate the signatures on each and every frame (as signatures are based on sampling), the decoding of non-relevant luminance frames from the stream may be skipped. What actually happens is that the chosen luminance frames (the entire frames) are decoded and reconstructed.

Another method for determining weighted average luminance is described below. If one is willing to give up the ability to be robust to video scaling changes (that is changes to the size of the video frame), the signatures may be computed directly from the encoded macroblocks without inverting the DCT. The image from which the signature is calculated in this case is a map of DCT macroblocks. It will be noted that the DCT value is not a luminance value of a pixel of the decoded frame 32, but the DCT value is a measurement of luminance in a frequency domain representation giving a frequency representation of luminance. For example, if a 16 by 16 pixel macroblock of a video frame undergoes a DCT transform, the result is a 16 by 16 matrix of values in the frequency domain. It is then possible to determine a weighted average of the 16 by 16 matrix in the same way one determines a weighted average for 16 by 16 pixels. Therefore, calculating the signatures can be done without having to fully decompress the video stream and reconstruct the individual frames, making the process much more efficient.

Figure 3:
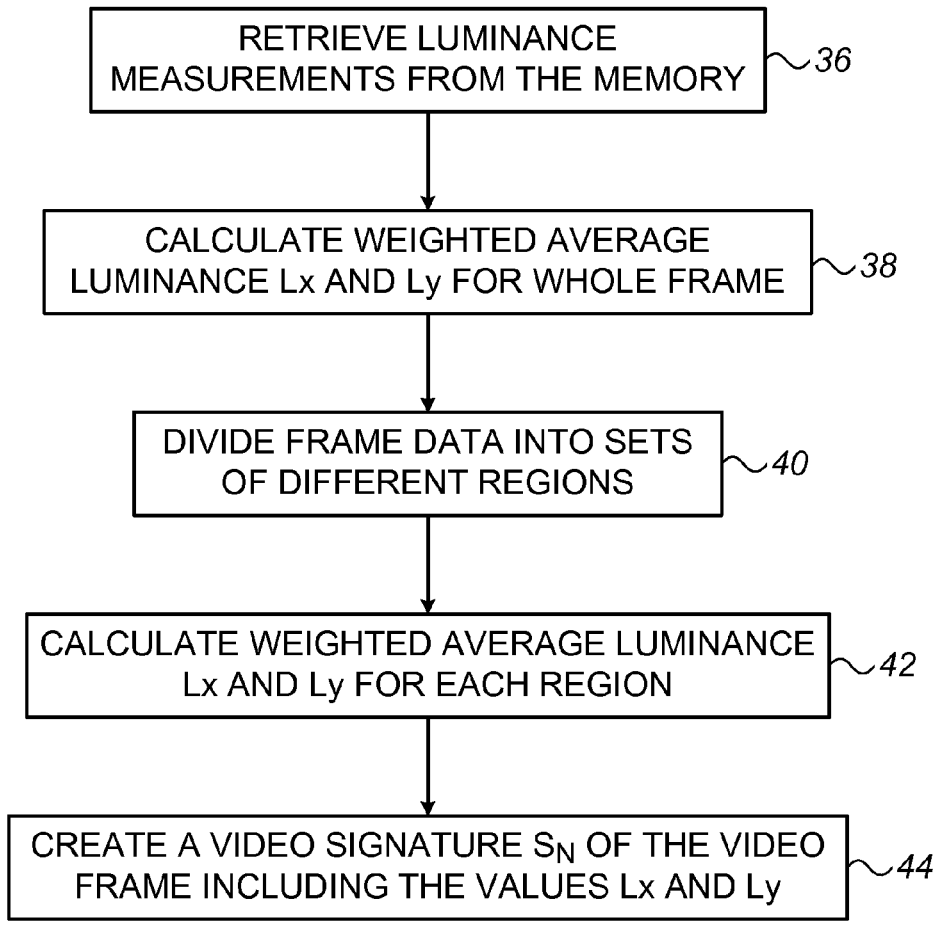
FIG. 3 shows a flow chart of exemplary steps performed in creating a video signature by the stream analyzer of FIG. 1 in accordance with an embodiment of the present invention.

Reference is now made to FIG. 3, which shows a flow chart of exemplary steps performed in creating a video signature by the stream analyzer 12 of FIG. 1 in accordance with an embodiment of the present invention.

The processor 24 is operative to retrieve, from the memory 26, data of the video frame 32 (block 36). The data typically includes a plurality of measurements of luminance. Each measurement of luminance is associated with a different entry in a matrix. The video frame 32 comprises a plurality of pixels. In one embodiment, each of the measurements of luminance provides a measure of luminance for a different one of the pixels so that the matrix is a matrix of the luminance values of the pixels of the video frame 32. Typically, all the pixels of the video frame 32 are used in the average weighted luminance calculation. However, a sample of the pixels may be used in the calculation. It is estimated that at least 60% of the pixels should be included in the measurements of luminance so that the measurements of luminance collectively providing a measure of luminance for at least 60% of the pixels.

In an alternative embodiment, each of the measurements of luminance may be a measure of luminance in a discrete cosine transform version of an image of the video frame, as discussed above, whereby the matrix is a matrix of DCT values.

The processor 24 is operative to calculate a weighted average luminance value Ly for the measurements of luminance such that each measurement of luminance is weighted according to a row position (y-axis coordinate) of that measurement of luminance in the matrix of the whole video frame 32. The processor 24 is operative to calculate a weighted average luminance value Lx for the measurements of luminance such that each measurement of luminance is weighted according to a column position (x-axis coordinate) of that measurement of luminance in the matrix of the whole video frame 32 (block 38).

The processor 24 is operative to divide the data of the video frame 32 into a plurality of sets of measurements of luminance corresponding to a plurality of different regions 34, R, of the video frame 32, each of the sets being associated with a different sub-matrix of the matrix (block 40).

The processor 24 may be operative to divide the data of the video frame 32 into the sets of measurements of luminance such that some of the sets of measurements of luminance correspond to a plurality of different regions 34 of the video frame 32 and some of the sets of measurement of luminance correspond to sub-regions of the different regions 34 of the video frame.

In one embodiment, the processor 24 is operative to divide the data of the video frame 32 into the sets of measurements of luminance by dividing the video frame 32 into four regions 34, each of the four regions 34 corresponding to a different one of the sets. The processor 24 is operative to further divide each of the four regions 34 into four sub-regions 34, each of the sub-regions 34 corresponding to a different one of the sets.

For each set of measurements of luminance corresponding to the regions and sub-regions, R, the processor 24 is operative to: (a) calculate a weighted average luminance value, Ly(R), for the measurements of luminance in that set such that each measurement of luminance is weighted according to a row position (y-axis coordinate) of that measurement of luminance in the sub-matrix of that set; and (b) calculate a weighted average luminance value, Lx(R), for the measurements of luminance in that set such that each measurement of luminance is weighted according to a column position (x-axis coordinate) of the measurement of luminance in the sub-matrix of that set (block 42).

The processor 24 is operative to create a video signature, $S_N$, of the video frame 32 (block 44). The video signature, $S_N$, includes the weighted average luminance value Ly and the weighted average luminance value Lx at the frame level. For each set of measurements of luminance corresponding to the regions and sub-regions, R, the processor 24 is operative to append to the video signature, $S_N$, of the video frame 32, the weighted average luminance value, Ly(R), of that set and the weighted average luminance value, Lx(R), of that set. Therefore, the video signature, $S_N$, includes a plurality of weighted average luminance values calculated for three or more levels of frame division. The three or more levels include: (a) not dividing the frame 32; (b) dividing the frame 32 into the different regions 34; and (c) dividing each of the different regions into sub-regions.

Signature Matching

Signature matching is performed at two levels. The first level is matching a single frame and the second level is matching a plurality of frames in a video sequence. Matching a single frame is now described.

Matching a Single Frame

Figure 4:
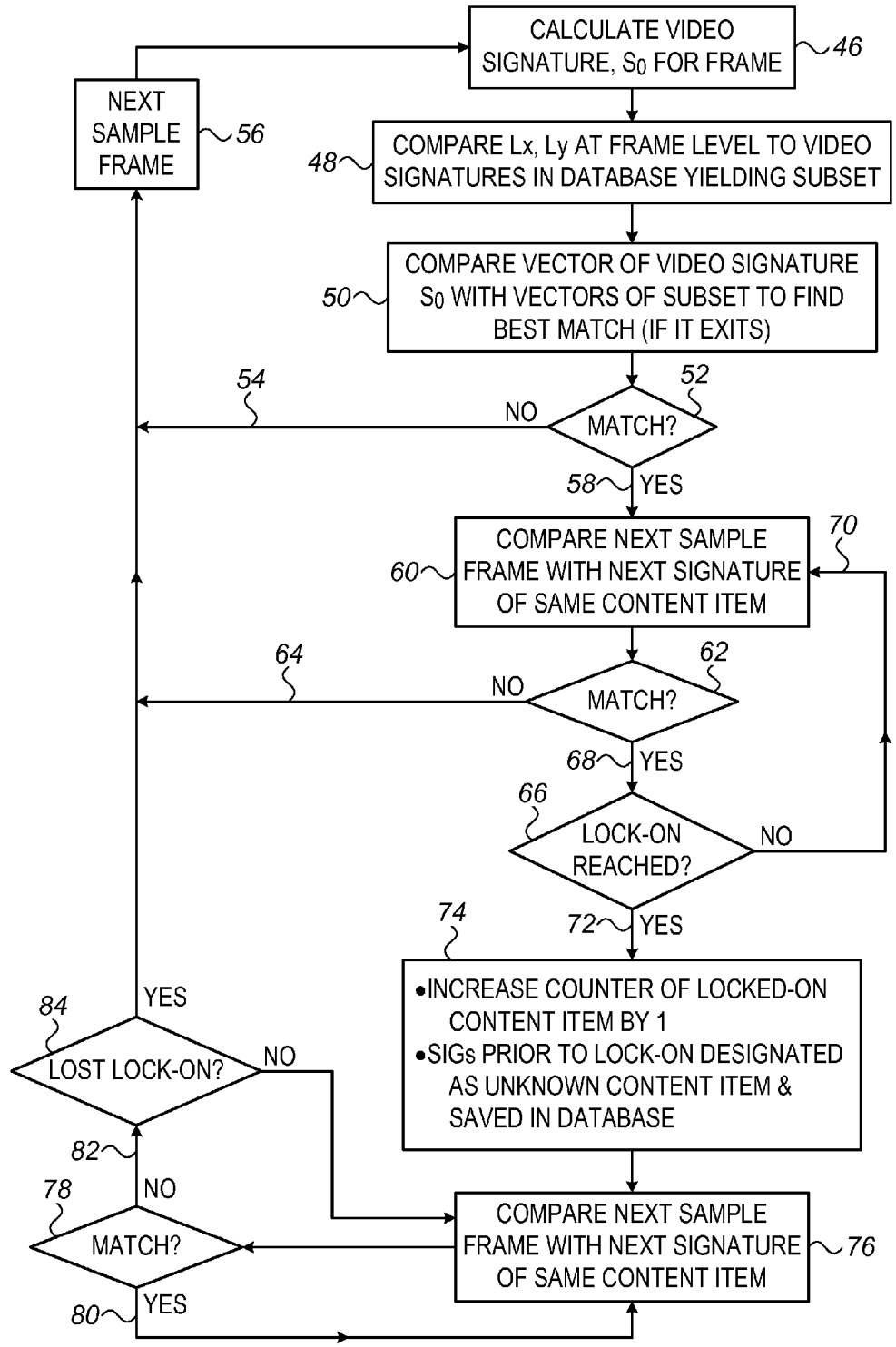
FIG. 4 shows a flow chart of exemplary steps performed in matching a video signature by the stream analyzer of FIG. 1 in accordance with an embodiment of the present invention.

Reference is now made to FIG. 4, which shows a flow chart of exemplary steps performed in matching a video signature by the stream analyzer 12 of FIG. 1 in accordance with an embodiment of the present invention.

Single frame matching is now described in overview.

Given a signature of a target frame for lookup, the matching process starts with a coarse search, extracting a set of candidate signatures from the database 22. A finer-grain search is then performed on the set of candidates. This 2-phase search is used to enhance the search performance allowing the search to be performed efficiently in real-time and on large data volumes.

The coarse search looks at the weighted average luminance pair computed at the frame level and retrieves signatures that match:

(x,y)=(x',y')+/−epsilon or less of the (i.e.: have a maximum difference of epsilon).

Epsilon is determined based on a variety of factors discussed in more detail below. By way of example, epsilon may be in the range of $2^{-8}$ to $2^{-5}$ of a maximum luminance value.

(x,y) is the weighted average luminance pair of the signature for the target frame and (x',y') is the weighted average luminance pair of a signature in the database 22.

A finer search is then performed in the candidate set by looking at the signatures as vectors with 42 or 170 elements (depending on the number of levels of division of the frame are used to generate the signatures) and computing the Pearson (product-moment) correlation or other suitable correlation between the target frame's signature and the signatures of each one of the candidate frames. The possible matching methods are described in more detail below. Correlation coefficients under a certain level are filtered out and among the remaining candidates, if any, the one with the highest correlation coefficient is chosen as the match. The level of correlation at which filtering out occurs is discussed in more detail below.

The signature matching process is now described in more detail.

A video signature, $S_O$ is typically calculated for the target frame in accordance with the method described with reference to FIGS. 2A-3 (block 46). However, the video signature, $S_O$, may be generated according to any suitable video signature generation method. The video signature, $S_O$, includes at least one average, typically weighted average, luminance value L of the target video frame (typically including a weighted average luminance value, Lx, and a weighted average luminance value, Ly) and a plurality of average, typically weighted average, luminance values of a plurality of different regions, R, of the target video frame so that for each of the different regions, R, of the target video frame, there is: (a) a weighted average luminance value, Lx(R); and (b) a weighted average luminance value, Ly(R).

The processor 24 is typically operative to retrieve, from the memory, the video signature, $S_0$.

The database 22 includes a plurality of previously processed video signatures, Si, generated in accordance with the method described with reference to FIGS. 2A-3 or other suitable method. Each video signature, Si, typically includes a weighted average luminance value, Lxi, and a weighted average luminance value, Lyi, at the frame level. Each video signature, Si, also includes, for each of a plurality of regions corresponding to the different regions, R, of the target video frame of the video signature, $S_0$ (in other words all the video signatures are generated on the basis of the same regions and sub-regions so that all the signatures may be compared like-for-like): (a) a weighted average luminance value, Lx(R)i; and (b) a weighted average luminance value, Ly(R)i.

The processor 24 is operative to determine a subset of the video signatures, Si, which best match the at least one average luminance value L at the frame level (typically including a weighted average luminance value, Lx, and a weighted average luminance value, Ly) of the video signature, $S_0$ (block 48) according to a matching criteria.

The subset is typically determined by the processor 24 comparing: the weighted average luminance value Lx to the weighted average luminance value Lxi of each of the plurality of video signatures, Si; and the weighted average luminance value Ly to the weighted average luminance value Lyi of each of the plurality of video signatures Si.

It should be noted that there may be differences in the weighted average luminance of two frames which should provide a match due to various factors including differences introduced by lossy compression, different logos and other small artifacts in the different versions of a content item as well as timing differences due to the sampling rate. The processor 24 is operative to determine the subset of video signatures Si to include the video signatures Si having: (a) the weighted average luminance value Lxi within a first limit of the weighted average luminance value Lx of the video signature $S_0$; and (b) the weighted average luminance value Lyi within a second limit of the weighted average luminance value Ly of the video signature $S_0$. By way of example, the first limit and the second limit may be in the range of $2^{-8}$ to $2^{-5}$ of the maximum luminance value. For high definition content it is expected that this range would narrow to between $2^{-8}$ and $2^{-6}$, and for standard definition content to between $2^{-7}$ and $2^{-5}$. The inventors found that setting the limit at $2^{-7}$ (0.0078) was particularly useful for matching high definition content on the fly from various content sources. It will be appreciated that the exact value or range of epsilon will depend on many factors, including the memory and processing power of the computer performing the comparison, the number of content items in the database and the time available for the processing (e.g.: online versus offline processing), and the variety of content, by way of example only. The limit could be set to any suitable value in order to create a subset which does not exclude matches but does not create such a large subset which could create a processing burden. For example, the first and second limit could be set as a percentage of the maximum luminance value, for example, but not limited to, 1 or 2% of the maximum luminance value or the first and second limit may be set to equal a certain number, e.g.: 0.5, 1 or 2 when the luminance range is in the range 0 to 255.

The processor 24 is operative to compare at least the plurality of the weighted average luminance values for the regions and sub-regions, R (and typically all the weighted luminance values) of the signature $S_0$ to the subset of the video signatures, Si, to try to find a best matching one of the video signatures, Si, in the subset which fulfills a matching criteria (block 50). The comparison is typically performed by considering the values of each signature as a vector and comparing each value in the vector of the signature $S_0$ with the same value in the vector of the video signatures, Si, of the subset.

As part of the comparison, the processor 24 is operative to compute a correlation (or other suitable matching measurement) between the vector of the video signature, $S_0$ and the vector of each of the video signatures, Si, in the subset based on a correlation of (a) the measurements of average weighted luminance, Lx, Ly, Lx(R) and Ly(R) to (b) the measurements of weighted average luminance, Lxi, Lyi, Lx(R)i and Ly(R)i, respectively, for each of the different regions R, for each of the video signatures, Si.

The processor 24 is operative to select one of the video signatures, Si, when the computed correlation of the video signature, Si, with the video signature $S_0$ has a correlation coefficient which is greater than a certain minimal correlation coefficient and is the highest correlation coefficient of all the video signatures Si in the subset. The minimal correlation coefficient is configurable and is typically in the range of 0.5 to 0.9. If the value is too high, matches may be missed. If the value is too low, false positives may result. It should be noted that the exact coefficient value may depend on the type of video content being examined. The inventors' experimentation has shown that a coefficient of 0.708 is suitable for a variety of video content types. The correlation is typically computed based on the Pearson (product-moment) correlation or any other suitable correlation method for example, but not limited to, Spearman and Kendall correlation methods. Other methods to measure the similarity of the signatures could be used to find the best match between the subset of video signatures Si and the video signature $S_0$, for example, but not limited to, calculating a Euclidean distance.

It should be noted that during the matching process between the video signature $S_0$ and the subset of video signatures Si, all sections of the vector of each signature $S_0$ and Si may be given equal weighting or different sections of the vector may be given different weightings, for example, giving higher weighting to regions of the video frame in the center of the video frame and lower weighting to outside regions of the video frame which may contain subtitles or a channel bugs/logos or to give higher weighting to a section of the video frame which is associated with greater change and/or motion possibly based on analysis of the motion vectors of the encoded video frame, by way of example only.

The next stage in the processing depends on whether a match was found for the video signature $S_0$ (block 52). If no match was found (branch 54) then the next sample frame (block 56) is retrieved and processing continues with the step of block 46. If a match was found (branch 58), the processing continues to match more frames from the content item C of the matching signature, Si, as will be described in more detail below.

Matching a Video Sequence

Reference is still made to FIG. 4.

Matching single frames does not necessarily indicate matching video content items or sequences. In order to match video content, a "Lock-On" mechanism is used. If several consecutive signatures belonging to the same content item match, it is considered that we have "locked-on" to that content item. The processor 24 continues to compute and match signatures to identify when the lock-on might be lost, for example, on an ad break or if there is an edited version of the original content. A lock is lost if several consecutive frames fail to match. The number of consecutive frames required for locking on or off as well as the tolerance for non-matching frames (the number of non-matching frames allowed between matching frames) may depend on various factors, for example, but not limited to, the sampling rate (described above), how many levels of frame division are included in the signatures and the variety of content being examined. The number of frames for locking on or off may be in the range of 2 to 10 frames, but the range could extend higher than 10. Allowance for non-matching frames may be in the range of 1 to 4 frames, but may be higher than 4.

Matching a video sequence is now described in more detail.

The next sample frame from the broadcast stream is processed to generate a video signature $S_1$. The video signature $S_1$ is compared to the next video signature $C_1$ in the content item C (block 60).

The comparison process is typically based on the comparison used in the step of block 50 to see if there is a correlation (and therefore a match) of the vector of the video signature S1 and the vector of the video signature C1.

At decision block 62, if there is not a match, processing continues along branch 64 to block 56 and then to block 46. It should be noted that a tolerance may be allowed for non-matching frames at this point and processing may continue with block 60 in any case. If there is a match, processing continues along branch 68 with decision block 66.

At block 66, the processor 24 checks whether the lock-on has been reached. If lock-on has not been reached, processing continues along branch 70 to the step of block 60. If lock-on has been reached, processing continues along branch 72 with block 74.

At block 74, the processor 24 is operative to increase a counter of the locked-on content item by 1. The counter may be used for various searching heuristics described in more detail later on. The processor 24 is also operative to designate the video signatures generated from the broadcast stream, prior to the lock-on, as an unknown content item and store the video signatures in the database 22. It should be pointed out that all frames from the broadcast stream for which video signatures are generated by the processor 24 may be linked to a content item (known or unknown) from the database 22 based on the lock-on and lock-off process.

Processing then continues with block 76 which compares the next sample frame with the next signature in the content item C and processing continues at decision block 78. At decision block 78, if there is a match (branch 80) processing continues with block 76. If there is not a match (branch 82) processing continues with decision block 84. It should be noted that a tolerance may be allowed for non-matching frames at this point and processing may continue with block 76.

At decision block 84, the processor checks to see whether lock-on has been lost. If lock-on has not been lost (branch 86) processing continues with the step of block 76. If lock-on has been lost (branch 88) processing continues with block 56 and then block 46.

Sampling

According to experiments performed by the inventors, sampling 1 frame per second gives a good balance between performance and accurate matching. When choosing the sampling rate, there is a trade off between performance and accuracy. On the one hand, using a higher sampling rate allows matching of a video sequence with a higher accuracy level. On the other hand, a higher sampling rate requires more resources, lowering the overall system performance. Sampling 2, 3 or 4 or more frames per second or sampling one frame in more than one second is also possible taking into account the balance between performance and accurate matching.

Robustness

It should be noted that the video signature generation and checking method is resilient to resolution changes (video scaling) that maintain the aspect ratio, video frame rate or bit-rate changes that may affect the image quality, e.g. blocking or pixelation, and to small OSDs appearing on the video such as channel bugs or tickers or logos that may appear in different area of the screen.

The checking method is particularly resilient to frame rate changes as the sampling is done per time-unit.

It should be noted that the signatures may be slightly affected by the above factors, but with proper calibration of the signature matching and lock-on parameters, the matching method is able to overcome the above factors and match the content.

Resilience

There may be a time-shift in the sampling start point of the two video sequences being compared. For example, the original sequence may have sampled frames 1, 26, 51, 76, 101, . . . and the repeat sequence may have sampled frames 5, 30, 55, 80, 105, . . . and so on. The "Lock-On" mechanism is generally resilient to such time-shifts. Even when frames are shifted, sampled frames will have very similar signatures so long as they are sampled from the same scene. A scene change may cause a single mismatch while subsequent frames should continue to match. The lock-on mechanism is also typically resilient to an occasional mismatch.

Matching Heuristics

Figure 5:
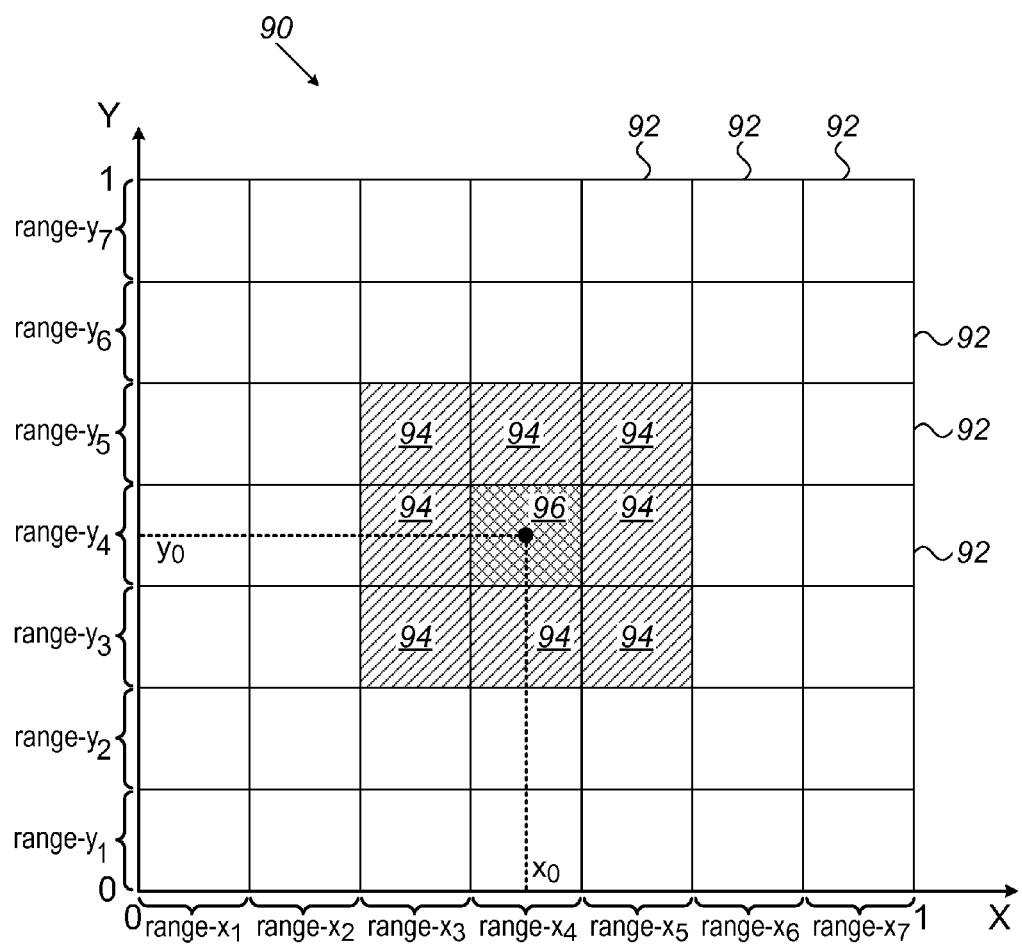
FIG. 5 is a view of a two-dimensional hash table used by the stream analyzer of FIG. 1 in accordance with an embodiment of the present invention.

Reference is now made to FIG. 5, which is a view of a two-dimensional hash table 90 used by the stream analyzer 12 of FIG. 1 in accordance with an embodiment of the present invention.

For some applications, such as TV broadcasts, where there is a need to index hundreds of channels, 24 hours a day, 7 days a week, the data volume in the database 22 can grow rapidly, which can adversely affect the search time when trying to match content. This may become even more important if the matching needs to be performed in real-time.

The two-dimensional hash table 90 and its associated hash-function are designed to speed up the searching process.

The two-dimensional hash table 90 is operational over the range ([0,0],[1,1]) from 0 to 1 along the x-axis and from 0 to 1 along the y-axis. The range in divided into buckets 92 (only some are labeled for the sake of clarity). The x-axis is divided into sub-ranges, range-X1, range-X2 etc. The y-axis is divided into sub-ranges, range-Y1, range-Y2 etc. The bucket size is the accepted maximum difference between similar frames (the epsilon) used in determining the sub-set described with reference to FIG. 4. Signatures are mapped into the buckets 92 based on the first two values (x,y pair) in the vector of the signature according to the ranges of x and y values covered by each bucket 92. The first two values represent the weighted average luminance of the video frame as a whole. Thus, similar signatures will be mapped to the same bucket 92 or to adjacent buckets.

In the example of FIG. 5, a video signature having a pair of values X0 and Y0 are mapped to the bucket having the x-range range-X4 and the y-range range-Y4 in which the values X0 and Y0 fall into, respectively.

It will be appreciated that the bucket size is defined by the hash function used with the hash table. The hash-function is defined in more detail with reference to FIGS. 6 and 7.

Upon lookup, the signatures that are stored in the same bucket 96 as the look-up signature and the signatures stored in a plurality of buckets 94 in the surrounding epsilon neighborhood of the look-up signature are candidates for matching.

A finer search is then performed on the candidate set by computing the Pearson correlation, or any suitable correlation method, between the lookup vector and candidate vectors to find the candidate that is closest to the lookup signature, and larger than the predefined threshold. If such a signature is found, it is considered a match to the lookup signature.

The hash table may be further enhanced by adding a second level of hashing, which will be based on the next four (x,y) tuples in the signature vector, generated as a result of dividing the frame into 4 (2×2) blocks. Thus, this 2nd hashing level would use 8-dimensional buckets where each dimension is in the range [0,1].

The search time may be further reduced by distributing the hash-table over different processors/servers, for example, one bucket per machine.

Figure 6:
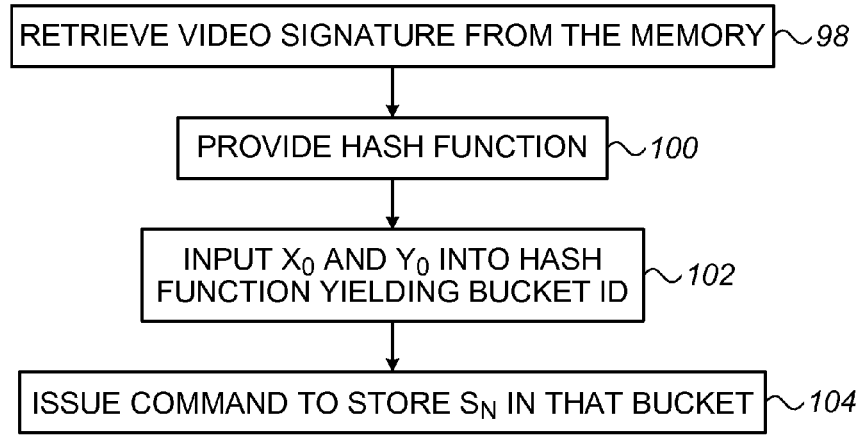
FIG. 6 shows a flow chart of exemplary steps performed in populating the two-dimensional hash table of FIG. 5 in accordance with an embodiment of the present invention.

Reference is now made to FIG. 6, which shows a flow chart of exemplary steps performed in populating the two-dimensional hash table 90 of FIG. 5 in accordance with an embodiment of the present invention.

The two-dimensional hash table 90 is described with reference to storing and retrieving a video signature. However, it should be noted that the two-dimensional hash table 90 may be used to store any suitable data element whether comprising a digital signature or not.

The processor 24 is operative to retrieve a video signature from the memory 26, the video signature including a value X0 and a value Y0 (block 98). The value X0 and the value Y0 may be average luminance values of a whole video frame. The video signature may have been previously generated by the processor 24 or by another processor from a frame included in a broadcast stream or other video sequence and is now ready for storage.

The processor 24 is operative to provide a hash function for use with the two-dimensional hash table 90 having the buckets 92 (block 100). The hash function has a plurality of inputs including a first input and a second input that in combination map to one of the buckets 92. The first input is in a range of X-values having a plurality of non-overlapping X-value sub-ranges, e.g.: range-X1, range-X2 etc. of FIG. 5.

The second input is in a range of Y-values having a plurality of non-overlapping Y-value sub-ranges, e.g.: range-Y1, range-Y2 etc. of FIG. 5.

The hash function is provided such that a size of any of the X-value sub-ranges is equal to a first limit and a size of any of the Y-value sub-ranges is equal to a second limit. The first limit and second limit are set according to criteria used in determining a sub-set of candidate video signature matches for the video signature in the hash-table 90. The first limit may be based on a maximum acceptable matching difference criteria between an X-value in each of a plurality of video signatures and the value X0 of the video signature. The second limit may be based on a maximum acceptable matching difference criteria between a Y-value in each of the video signatures to the value Y0 of the video signature. The first limit may be in the range of $2^{-8}$ to $2^{-5}$ of a maximum value in the range of X-values and the second limit may be in the range of $2^{-8}$ to $2^{-5}$ of a maximum value in the range of Y-values or any other suitable value as described in more detail above with reference to FIG. 4.

An example of a suitable hash function is given below assuming the bucket dimension E (range of a bucket) is the same in both the x axis and y axis and that the maximum x value (Xmax) and the maximum y value (Ymax) are the same.

The bucket identification for a given x,y pair is given by the following hash function:

$$\text{bucket ID}=[(Y(\text{ru})-1)*X\text{max}/E]+X(\text{ru}),$$

where X(ru) roundup (x/E), where the roundup function rounds up (x/E) to the nearest integer;

where Y(ru)=roundup (y/E), where the roundup function rounds up (y/E) to the nearest integer; and where the buckets are labeled 1, 2, 3 . . . etc.

Another example of a hash function is to define each bucket in the hash table as having a certain row and column value in the hash table matrix. Then, the row and column values could be calculated based on: column value of bucket=floor (x/E) and row value of bucket=floor (y/E), where floor rounds down to the nearest integer.

It will be appreciated by one ordinarily skilled in the art of computer programming that a suitable hash function may be constructed based on the requirements described above.

The processor 24 typically provides the hash-function by retrieving the hash-function from the memory 26.

When the first input is any value in one of the X-value sub-ranges and the second input is any value in one of the Y-value sub-ranges, the hash function maps to a same one of the buckets 92. Different combinations of the X-value sub-ranges and the Y-value sub-ranges map using the hash function to different ones of the buckets 92.

The processor 24 is operative to input the value X0 and the value Y0 into the hash function yielding an output which is indicative of the bucket 96 of the buckets 92 of the hash-table 90 (block 102). The bucket 96 is brought by way of example and the exact bucket selected will depend on the input values of the hash function.

The processor 24 is operative to issue a command to store the video signature in the bucket 96 (block 104). The processor 24 may store the video signature in the database 22 or instruct another remote processor to store the video signature in a suitable database.

Similarly, the hash-table 90 is operative to store a plurality of video signatures Si in the buckets 92 according to an X value and a Y value of each of the video signatures Si.

Figure 7:
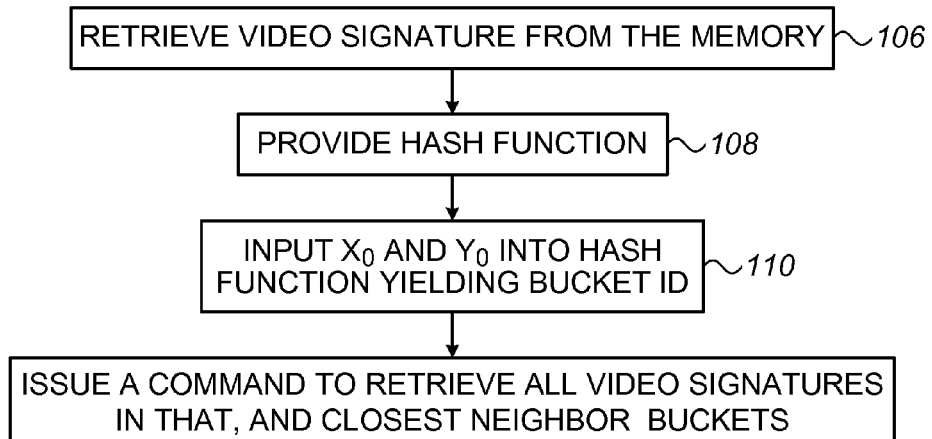
FIG. 7 shows a flow chart of exemplary steps performed in extracting data from the two-dimensional hash table of FIG. 5 in accordance with an embodiment of the present invention.

Reference is now made to FIG. 7, which shows a flow chart of exemplary steps performed in extracting data from the two-dimensional hash table 90 of FIG. 5 in accordance with an embodiment of the present invention.

The processor 24 is operative to retrieve a video signature $S_0$ from the memory 26, the video signature $S_0$ including a value X0 and a value Y0 (block 106). The value X0 and the value Y0 may be average luminance values of a whole video frame. The video signature $S_0$ may have been previously generated by the processor 24 or by another processor from a frame included in a broadcast stream or other video sequence and is now provided as a look-up signature in order to find a suitable match in the two-dimensional hash table 90.

The processor 24 is operative to provide a hash function for use with a hash table as previously defined with reference to FIG. 6 (block 108).

The processor 24 is operative to input the value X0 and the value Y0 of the video signature $S_0$ into the hash function yielding an output which is indicative of the bucket 96 of the buckets 92 of the hash-table 90 (block 110). The bucket 96 is associated with one of the X-value sub-ranges (range-X4 of FIG. 5) and one of the Y-value sub-ranges (range-Y4 of FIG. 5).

The processor 24 is operative to issue a command to retrieve all the video signatures Si stored in the bucket 96 and all the video signatures Si stored in the eight different buckets 94 (FIG. 5) adjacent in terms of sub-range to the bucket 96, such that each of the eight buckets 94 is associated with: one of the X-value sub-ranges, adjacent to, or the same as, the X-value sub-range of the bucket 96; and one of the Y-value sub-ranges, adjacent to, or the same as, the Y-value sub-range of the bucket 96. It should be noted that if the two-dimensional hash table 90 is stored entirely in the database 22, then the processor 24 is typically operative to retrieve the video signatures Si from the buckets 94, 96. However, if the buckets 94, 96 are stored on another server or distributed over several servers, the processor 24 is operative to issue the command to have the video signatures Si retrieved and typically analyzed by the remote server(s) by issuing a command to compare at least part of the video signature $S_0$ to the video signatures Si retrieved from the bucket 96 and the eight buckets 94.

Figure 8:
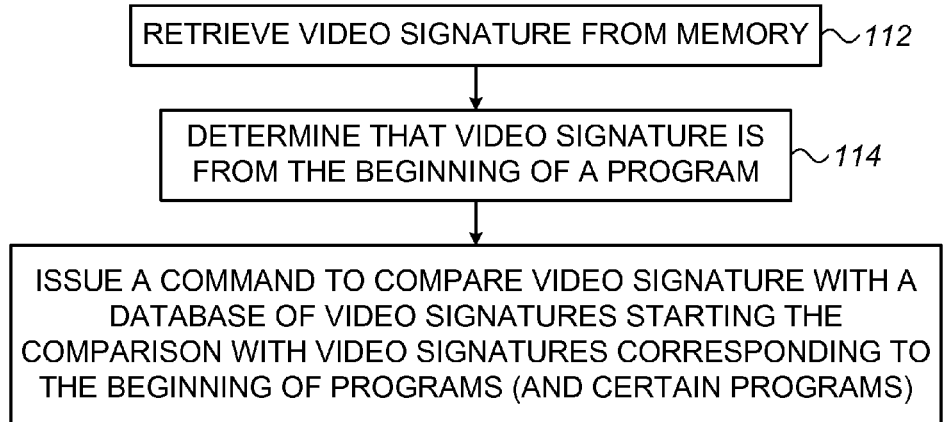
FIG. 8 shows a flow chart of exemplary steps performed in a method for improving signature matching speed by the stream analyzer of FIG. 1 in accordance with an embodiment of the present invention.

Reference is now made to FIG. 8, which shows a flow chart of exemplary steps performed in a method for improving signature matching speed by the stream analyzer 12 of FIG. 1 in accordance with an embodiment of the present invention.

In addition to, or instead of, the hash table described above with reference to FIGS. 5-7, other advanced search heuristics can be applied to further reduce the search space.

Assuming the stream analyzer 12 has access to the broadcast schedule, and has previously identified and tagged some of the content in the database 22, when the broadcast schedule indicates a new event is about to start, the stream analyzer 12 may use the event title to check whether the database 22 includes video signatures associated with that title. If so, the stream analyzer 12 may fetch the first few signatures of such matching content titles and give higher priority to matching against the signatures with the matching titles.

If there are no previously indexed events in the database 22 tagged with the same title as indicated from the broadcast schedule or if the broadcast schedule is not checked for any reason, the stream analyzer 12 may prioritize matching against signatures that were generated from the frames at the beginning of content items. For example, a 40 minute program sampled at 1 frame per second will produce 40×60=2400 signatures. Matching against the first 5-10 signatures can reduce the search space to 0.02% of the original size.

The processor 24 is operative to retrieve a video signature $S_0$ from the memory 26 (block 112). The video signature $S_0$ may be a video signature of a content item (e.g.: TV program, advertisement, trailer, promotional video) currently being broadcast. The video signature $S_0$ may have been generated by the processor 24 or by another processor/server.

The processor 24 is optionally operative to receive program guide data.

The processor 24 is operative to determine whether or not the video signature $S_0$ corresponds to a beginning of the content item currently being broadcast (block 114). The beginning of the content item may be defined as within the first five minutes of the start of the content item, but the time could be defined to be a lot shorter than five minutes, for example 5-20 seconds. The processor is optionally operative to analyze a video stream to identify scrolling and/or credits of a content item indicating that a new content item is due to start.

The processor 24 is operative to issue a command to compare the video signature $S_0$ to a database of video signatures starting the comparison from the video signatures corresponding to the beginning of content items (and optionally the content items identified as being currently broadcast according to the program guide data) before searching other ones of the video signatures (block 116).

Adverts, promotional videos and similar content are likely to not only be repeating content, but to also repeat at a high frequency. Thus, the stream analyzer 12 may give higher search priority to content that has already appeared several times, and recently, as it is more likely to appear again.

Metadata Aspects

Figure 9:
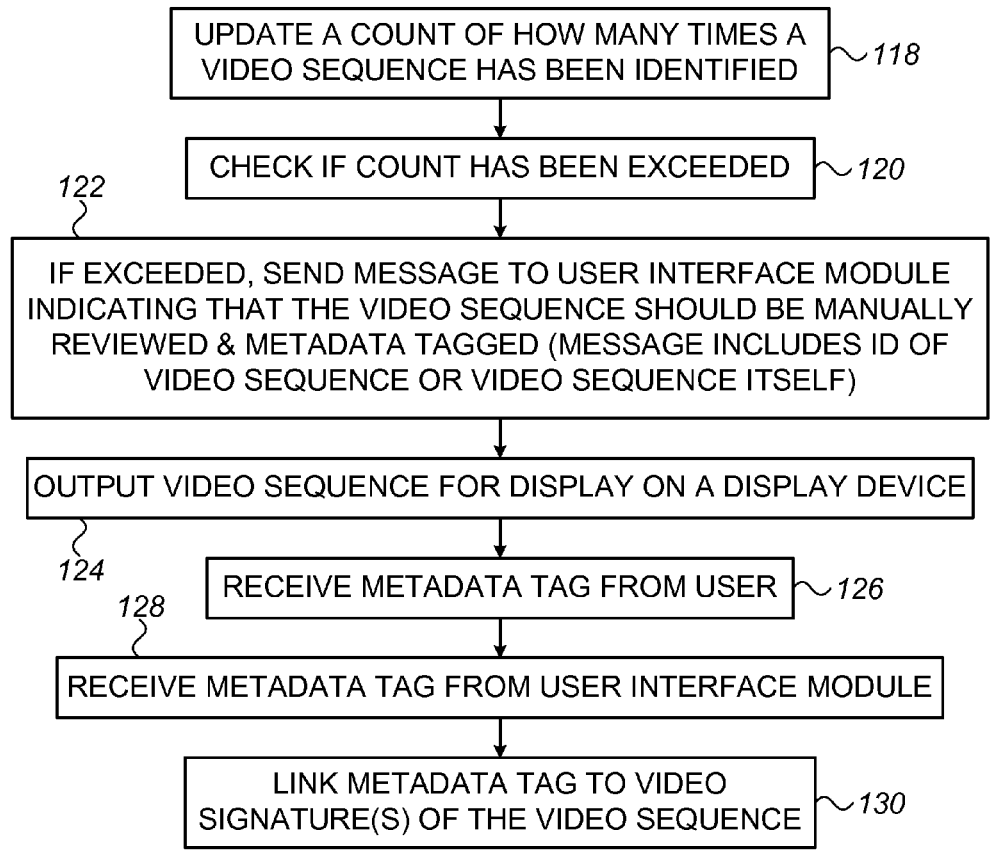
FIG. 9 shows a flow chart of exemplary steps performed in a method for identifying video signatures for metadata tagging by the stream analyzer of FIG. 1 in accordance with an embodiment of the present invention.

Reference is now made to FIG. 9, which shows a flow chart of exemplary steps performed in a method for identifying video signatures for metadata tagging by the stream analyzer 12 of FIG. 1 in accordance with an embodiment of the present invention.

Metadata generation is often performed manually on-the-fly. Manually generating metadata for many channels at once is tedious and the metadata is often produced too late to be useful.

The stream analyzer 12 is operative to determine which broadcast video content is being shown at a high frequency, and prioritize metadata generation efforts for those high frequency events. This is very useful for assisting with metadata generation for highly repeating content such as adverts, trailers, promotional videos, by way of example only.

The processor 24 is operative to update a count of how many times a video sequence has been identified in video stream(s) (block 118). The video sequence may be identified based on a positive match of video signatures from the broadcast stream with video signatures of the video sequence in the database 22 for example, when a video sequence has been "locked-on" to, as described above with reference of FIG. 4.

The processor 24 is operative to check if the count has exceeded a limit (block 120). The limit may depend on various factors, such as, how much time can be devoted to manual metadata tagging.

In response to exceeding the limit, the processor 24 is operative to send a message (including a content identifier (for example, a serial number of the video sequence in the database 22 or a stream ID and time code of the video sequence in the database 22) of the video sequence and/or the video sequence itself) to the user interface module 28 (FIG. 1) indicating that the video sequence should be manually reviewed and metadata tagged (block 122).

The user interface module 28 is operative to output the video sequence for display on the display device 30 (FIG. 1) (block 124).

The user interface module 28 is operative to receive the metadata tag from a user (block 126).

The processor 24 is operative to receive the metadata tag from the user interface module 28 (block 128).

The processor 24 is operative to link the metadata tag to the video signature(s) of the video sequence (block 130).

Figure 10:
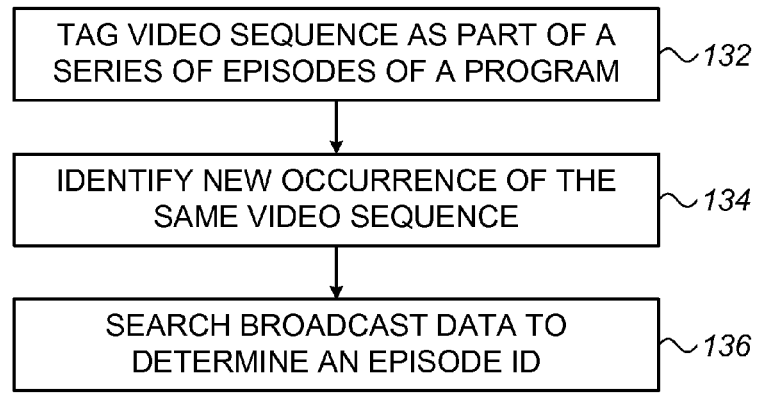
FIG. 10 shows a flow chart of exemplary steps performed in a method for tagging video signatures associated with a series of episodes of a program by the stream analyzer of FIG. 1 in accordance with an embodiment of the present invention.

Reference is now made to FIG. 10, which shows a flow chart of exemplary steps performed in a method for tagging video signatures associated with a series of episodes of a program by the stream analyzer 12 of FIG. 1 in accordance with an embodiment of the present invention.

The video sequence may be metadata tagged as part of a series of episodes of a program, for example, the metadata tag described with reference to FIG. 9 may indicate that the video sequence is part of a series of episodes of a program (block 132).

The processor 24 is operative to identify a new occurrence of the video sequence in the video stream(s), after the video sequence has previously been metadata tagged as part of a series of episodes of a program (block 134).

The processor 24 is operative, in response to identifying a new occurrence of the video sequence in the video stream(s), after the video sequence has previously been metadata tagged as part of a series of episodes of a program, to search broadcast data to determine an episode identification associated with the new occurrence of the video sequence (block 136).

The processor 24 is then operative to add the episode identification to a video sequence which follows the episode introduction video sequence.

Figure 11:
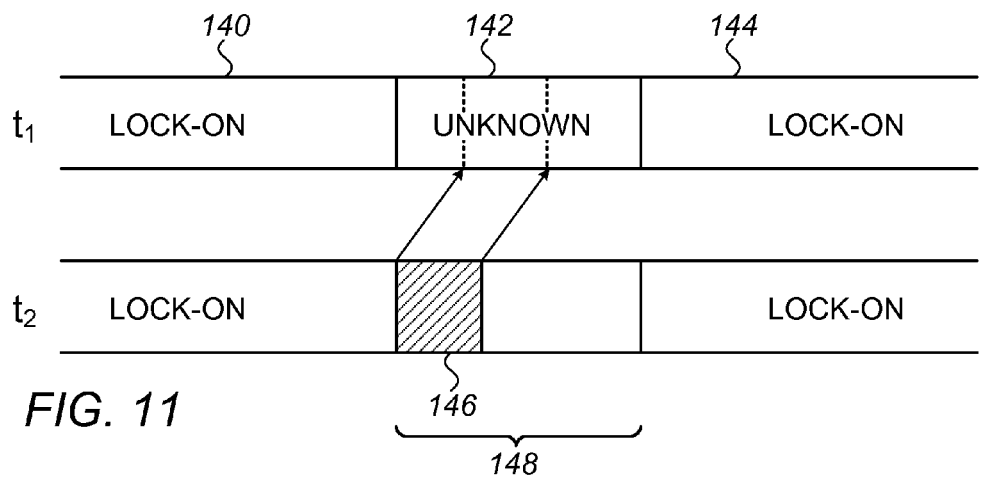
FIG. 11 shows two video sequences being processed by the stream analyzer of FIG. 1.

Reference is now made to FIG. 11, which shows two video sequences 138 being processed by the stream analyzer 12 of FIG. 1.

Using the lock-on/off mechanism, unknown content may be automatically split into separate pieces of content. For example, at time t in FIG. 11, if there is an advert/promotional break 142 in the middle of a TV show, the break can be identified by noting when the lock on the TV show (block 140) is lost (block 142) and regained again (block 144). However, the internal breakdown of the separate adverts/promotions is still unknown within the break 142. When at least one of the adverts/promotional items 146 appears again (at time t2 in FIG. 11) in a different order to the initial advert/promotional break or without the other items in the break 142, at least some of the boundaries of the adverts/promos in break 142 may be identified.

In the example of FIG. 1, the advert 146 is identified at the beginning of an ad break 148. The same advert 146 was also previously identified in the middle of the break 142. Therefore, two boundaries between content items may be identified in the break 142.

Once the adverts/promos repeat enough times, the method described with reference to FIG. 9 may be used to manually add metadata to those ads/promos.

Figure 12:
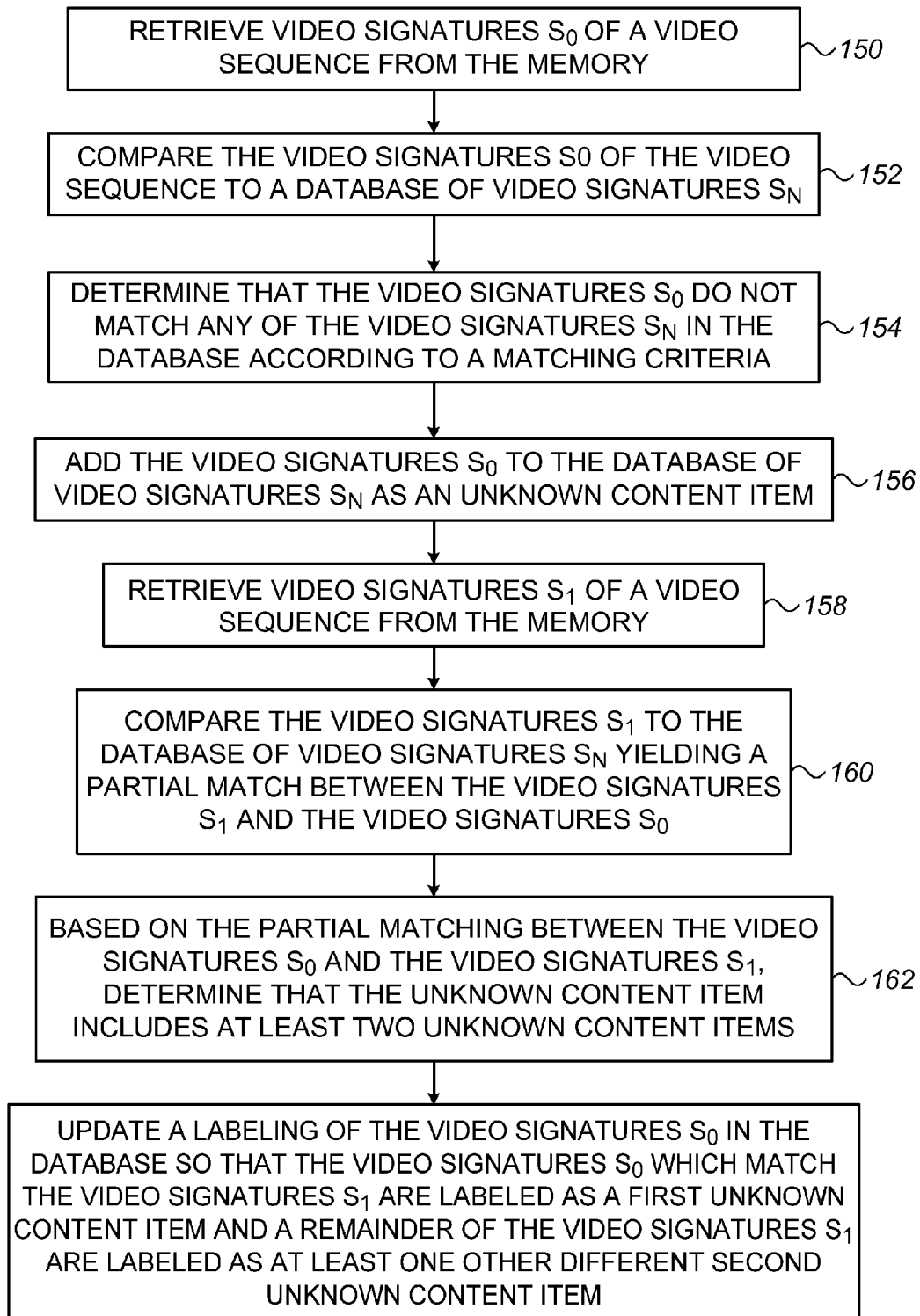
FIG. 12 shows a flow chart of exemplary steps performed in identifying content item boundaries within an unknown content item by the stream analyzer of FIG. 1 in accordance with an embodiment of the present invention.

Reference is now made to FIG. 12, which shows a flow chart of exemplary steps performed in identifying content item boundaries within an unknown content item by the stream analyzer 12 of FIG. 1 in accordance with an embodiment of the present invention.

The processor 24 is operative to retrieve a plurality of video signatures $S_0$ of a video sequence from the memory 26 (block 150). The video signatures $S_0$ were previously generated from video frames in a video sequence, for example, from a broadcast stream by the processor 24 or another server at a time t0.

The processor 24 is operative to compare the video signatures $S_0$ of the video sequence to the database 22 of video signatures $S_N$ (block 152).

The processor 24 is operative to determine that the video signatures $S_0$ do not match any of the video signatures $S_N$ in the database 22 according to a matching criteria (block 154), for example, the matching criteria described above with reference to FIG. 4.

The processor 24 is operative to add the video signatures $S_0$ to the database 22 of video signatures $S_N$ as an unknown content item (block 156).

The processor 24 is operative to retrieve a plurality of video signatures $S_1$ of a video sequence from the memory 26 (block 158). The video signatures $S_1$ were previously generated from video frames in a video sequence, for example, from a broadcast stream by the processor 24 or another server at a time t1.

The processor 24 is operative to compare the video signatures $S_1$ to the database 22 of video signatures $S_N$ yielding a partial match between the video signatures SI and the video signatures $S_0$ already stored in the database 22 (block 160).

The processor 24 is operative, based on the partial matching between the video signatures $S_0$ and the video signatures $S_1$, to determine that the unknown content item includes at least two unknown content items (block 162).

When the video signatures SI match the video signatures $S_0$ in a middle section of the unknown content item, the processor 24 is operative, based on the partial matching between the video signatures $S_0$ and the video signatures $S_1$, to determine that the unknown content item includes at least three unknown content items as in the example of FIG. 11.

The processor 24 is operative to update a labeling of the video signatures $S_0$ in the database so that the video signatures $S_0$ which match the video signatures $S_1$ are labeled as a first unknown content item and the remaining video signatures $S_0$ are labeled as at least one other different second unknown content item (block 164).

It should be noted that the methods described with reference to FIGS. 5-12 may be implemented with any suitable video signature generation and matching method and not only with the video signature generation and matching method of FIGS. 2-5. It should also be noted that the video signature may be generated on a per frame basis or may be a video signature which identifies a plurality of video frames in a single video signature. Similarly, where appropriate the video signature may be based on motion vectors, chrominance values and/or luminance values, by way of example only.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising a processor; and a memory to store data used by the processor, wherein the processor is operative to:
    retrieve a first data element from the memory, the first data element including a value X0 and a value Y0;
    provide a hash function for use with a hash table having a plurality of buckets, the hash function having a plurality of inputs including a first input and a second input that in combination map to one of the buckets wherein:
        (a) the first input is in a range of X-values having a plurality of non-overlapping X-value sub-ranges;
        (b) the second input is in a range of Y-values having a plurality of non-overlapping Y-value sub-ranges;
        (c) when the first input is any value in one of the X-value sub-ranges and the second input is any value in one of the Y-value sub-ranges, the hash function maps to a same one of the buckets; and
        (d) different combinations of the X-value sub-ranges and the Y-value sub-ranges map using the hash function to different ones of the buckets; and
    input the value X0 and the value Y0 of the first data element into the hash function yielding an output which is indicative of a first bucket of the buckets of the hash-table, wherein:
        the first bucket is associated with a first one of the X-value sub-ranges and a second one of the Y-value sub-ranges;
        a size of any of the X-value sub-ranges is equal to a first limit;
        a size of any of the Y-value sub-ranges is equal to a second limit;
        the first limit and second limit are set according to criteria used to determine a sub-set of candidate data element matches for the first data element in the hash-table;
        the first limit is based on a maximum acceptable matching difference criteria between an X-value in each of a plurality of data elements and the value X0 of the first data element;
        the second limit is based on a maximum acceptable matching difference criteria between a Y-value in each of the data elements and the value Y0 of the first data element; and
        the hash-table stores the plurality of data elements in the buckets according to an X value and a Y value of each one data element of the plurality of data elements;
    issue a command to retrieve all the data elements stored in the first bucket and all the data elements stored in eight different ones of the buckets adjacent in terms of sub-range to the first bucket, such that each of the eight buckets is associated with: one of the X-value sub-ranges, adjacent to, or the same as, the first X-value sub-range; and one of the Y-value sub-ranges, adjacent to, or the same as, the second Y-value sub-range; and
    issue a command to compare at least part of the first data element to the data elements retrieved from the first bucket and the eight buckets to find a closest match to the first data element among the data elements retrieved from the first bucket and the eight buckets thereby improving a computer search speed for finding the closest match.

2. The system according to claim 1, wherein the processor is operative to issue a command to store the first data element in the first bucket.

3. The system according to claim 1, wherein the first data element is comprised in a video signature, SN, of a video frame.

4. The system according to claim 3, wherein the value X0 and the value Y0 are average luminance values of the video frame.

5. The system according to claim 1, wherein the first limit is in the range of $2^{-8}$ to $2^{-5}$ of a maximum value in the range of X-values and the second limit is in the range of $2^{-8}$ to $2^{-5}$ of a maximum value in the range of Y-values.

6. The system according to claim 1, wherein: the first data element is comprised in a video signature, S0, of a video frame; and each of the plurality of data elements is comprised in a different video signature, Si.

7. The system according to claim 6, wherein the value X0 and the value Y0 are average luminance values of the video frame.

8. The system according to claim 6, wherein the first limit is in the range of $2^{-8}$ to $2^{-5}$ of a maximum value in the range of X-values and the second limit is in the range of $2^{-8}$ to $2^{-5}$ of a maximum value in the range of Y-values.

9. A method comprising:
    retrieving a first data element from a memory, the first data element including a value X0 and a value Y0;
    providing a hash function for use with a hash table having a plurality of buckets, the hash function having a plurality of inputs including a first input and a second input that in combination map to one of the buckets wherein:
        (a) the first input is in a range of X-values having a plurality of non-overlapping X-value sub-ranges;
        (b) the second input is in a range of Y-values having a plurality of non-overlapping Y-value sub-ranges;
        (c) when the first input is any value in one of the X-value sub-ranges and the second input is any value in one of the Y-value sub-ranges, the hash function maps to a same one of the buckets; and
        (d) different combinations of the X-value sub-ranges and the Y-value sub-ranges map using the hash function to different ones of the buckets; and inputting the value X0 and the value Y0 of the first data element into the hash function yielding an output which is indicative of a first bucket of the buckets of the hash-table, wherein:
   the first bucket is associated with a first one of the X-value sub-ranges and a second one of the Y-value sub-ranges;
   a size of any of the X-value sub-ranges is equal to a first limit;
   a size of any of the Y-value sub-ranges is equal to a second limit;
   the first limit and second limit are set according to criteria used to determine a sub-set of candidate data element matches for the first data element in the hash-table;
   the first limit is based on a maximum acceptable matching difference criteria between an X-value in each of a plurality of data elements and the value X0 of the first data element; and
   the second limit is based on a maximum acceptable matching difference criteria between a Y-value in each of the data elements and the value Y0 of the first data element; and
   the hash-table stores the plurality of data elements in the buckets according to an X value and a Y value of each one data element of the plurality of data elements;
issuing a command to retrieve all the data elements stored in the first bucket and all the data elements stored in eight different ones of the buckets adjacent in terms of sub-range to the first bucket, such that each of the eight buckets is associated with: one of the X-value sub-ranges, adjacent to, or the same as, the first X-value sub-range; and one of the Y-value sub-ranges, adjacent to, or the same as, the second Y-value sub-range; and
issuing a command to compare at least part of the first data element to the data elements retrieved from the first bucket and the eight buckets t find a closest match to the first data element among the data elements retrieved from the first bucket and the eight buckets-thereby improving a computer search speed for finding the closest match.

10. The method according to claim 9, further comprising issuing a command to store the first data element in the first bucket.

11. The method according to claim 9, wherein: the first data element is comprised in a video signature, S0, of a video frame; and each of the plurality of data elements is comprised in a different video signature, Si.

12. The method according to claim 11, wherein the value X0 and the value Y0 are average luminance values of the video frame.

13. The method according to claim 9, wherein the first limit is in the range of 2-8 to 2-5 of a maximum value in the range of X-values and the second limit is in the range of 2-8 to 2-5 of a maximum value in the range of Y-values.

14. The method according to claim 9, wherein the first data element is comprised in a video signature, SN, of a video frame.

15. The method according to claim 14, wherein the value X0 and the value Y0 are average luminance values of the video frame.

16. The method according to claim 14, wherein the first limit is in the range of 2-8 to 2-5 of a maximum value in the range of X-values and the second limit is in the range of 2-8 to 2-5 of a maximum value in the range of Y-values.

\* \* \* \* \*